(12) United States Patent
Lian et al.

(10) Patent No.: US 10,044,784 B2
(45) Date of Patent: Aug. 7, 2018

(54) METHOD FOR GENERATING MEDIA INFORMATION, TERMINAL, SERVER, AND AHS SYSTEM

(71) Applicant: Huawei Technologies Co., Ltd., Shenzhen (CN)

(72) Inventors: Shiguo Lian, Beijing (CN); Xin Wang, Santa Clara, CA (US); Yongliang Liu, Beijing (CN); Shaobo Zhang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 773 days.

(21) Appl. No.: 14/529,547

(22) Filed: Oct. 31, 2014

(65) Prior Publication Data
US 2015/0052259 A1 Feb. 19, 2015

Related U.S. Application Data

(63) Continuation of application No. PCT/CN2013/074597, filed on Apr. 24, 2013.

(30) Foreign Application Priority Data

May 2, 2012 (CN) .......................... 2012 1 0133456

(51) Int. Cl.
*H04L 29/06* (2006.01)
*H04L 29/08* (2006.01)
(Continued)

(52) U.S. Cl.
CPC .......... *H04L 65/607* (2013.01); *H04L 65/608* (2013.01); *H04L 67/02* (2013.01);
(Continued)

(58) Field of Classification Search
CPC ..... H04L 67/02; H04L 65/608; H04L 65/607; H04N 21/23439; H04N 21/2347;
(Continued)

(56) References Cited

U.S. PATENT DOCUMENTS 6,700,989 B1* 3/2004 Itoh ....................... G06T 1/0085
348/460
6,769,061 B1* 7/2004 Ahern ................. G06F 17/2205
713/168

(Continued)

FOREIGN PATENT DOCUMENTS

CN 1863041 A 11/2006
CN 102055717 A 5/2011
(Continued)

OTHER PUBLICATIONS

Thomas Stockhammer, "Dynamic Adaptive Streaming over HTTP—Design Principles and standards", Qualcom Incorporated, Mar. 2010. www.w3.org/2010/11/web-and-tv/papers/webtv2_submission_64.pdf.*

(Continued)

*Primary Examiner* — Oanh Duong
(74) *Attorney, Agent, or Firm* — Slater Matsil, LLP

(57) ABSTRACT

The present invention discloses a method for generating media information, a terminal, a server, and an adaptive streaming system. Media code streams of m types of code rate, which are generated by an AHS system, are divided into h groups, and tracing codes are separately embedded into code stream segments of each group. The tracing codes embedded into the code stream segments, and code stream group information are stored in a media presentation description MPD file. In a downloading process of a terminal, tracing of an end user that downloads media data is implemented.

19 Claims, 10 Drawing Sheets

(51) Int. Cl.
*H04N 21/2343* (2011.01)
*H04N 21/2347* (2011.01)
*H04N 21/24* (2011.01)
*H04N 21/258* (2011.01)
*H04N 21/426* (2011.01)
*H04N 21/845* (2011.01)

(52) U.S. Cl.
CPC ... *H04N 21/2347* (2013.01); *H04N 21/23439* (2013.01); *H04N 21/2402* (2013.01); *H04N 21/25816* (2013.01); *H04N 21/25825* (2013.01); *H04N 21/25858* (2013.01); *H04N 21/42684* (2013.01); *H04N 21/8456* (2013.01)

(58) Field of Classification Search
CPC ......... H04N 21/2402; H04N 21/25825; H04N 21/25858; H04N 21/42684; H04N 21/8456
See application file for complete search history.

(56) References Cited

U.S. PATENT DOCUMENTS

| | | | | |
|---|---|---|---|---|
| 8,190,677 | B2* | 5/2012 | Myers | H04N 21/23432 709/203 |
| 2003/0188168 | A1* | 10/2003 | Muratani | G06T 1/005 713/176 |
| 2004/0098593 | A1* | 5/2004 | Muratani | G06T 1/005 713/176 |
| 2006/0048237 | A1* | 3/2006 | Luo | H04L 63/0428 726/32 |
| 2006/0277410 | A1* | 12/2006 | Jajodia | G06T 1/005 713/176 |
| 2007/0165853 | A1* | 7/2007 | Jin | H04N 7/165 380/210 |
| 2007/0239695 | A1* | 10/2007 | Chakra | G06F 17/30165 |
| 2008/0123844 | A1 | 5/2008 | Sun | |
| 2008/0244407 | A1* | 10/2008 | Eklund | G11B 27/034 715/719 |
| 2012/0197847 | A1* | 8/2012 | Yang | G06F 17/30017 707/679 |
| 2012/0243727 | A1* | 9/2012 | Hwang | G06T 1/0085 382/100 |
| 2012/0246335 | A1 | 9/2012 | Liu et al. | |
| 2013/0007201 | A1* | 1/2013 | Jeffrey | H04M 1/72569 709/217 |
| 2013/0054972 | A1* | 2/2013 | Thorwirth | H04N 21/23439 713/176 |

FOREIGN PATENT DOCUMENTS

| | | | |
|---|---|---|---|
| CN | 102710603 A | 10/2012 | |
| WO | 2011047335 A1 | 4/2011 | |
| WO | WO 2013004260 A1 * | 1/2013 | ........... H04L 65/605 |

OTHER PUBLICATIONS

"3rd Generation Partnership Project; Technical Specification Group Services and System Aspects; Transparent end-to-end Packet-Switched Streaming Service (PSS); Protocols and Codecs (Release 9)," 3GPP TS 26.234, V9.6.0, Mar. 2011, 189 pages.

"Information Technology—MPEG Systems Technologies—Part 6: Dynamic Adaptive Streaming Over HTTP (DASH)," ISO/IEC JTC 1/SC 29, ISO/IEC FCD 23001-6, Jan. 28, 2011, 132 pages.

Lian, S., et al., "Collusion-Traceable Secure Multimedia Distribution Based on Controllable Modulation," IEEE Transactions on Circuits and Systems for Video Technology, vol. 18, No. 10, Oct. 2008, pp. 1462-1467.

Lian, S., et al., "Commutative Encryption and Watermarking in Video Compression," IEEE Transactions on Circuits and Systems for Video Technology, vol. 17, No. 6, Jun. 2007, pp. 774-778.

Nakayama, H., et al., "Network-Based Traitor-Tracing Technique Using Traffic Pattern," IEEE Transactions on Information Forensics and Security, vol. 5, No. 2, Jun. 2010, pp. 300-313.

Wang, J., et al., "Locally Optimum Detection for Barni's Multiplicative Watermarking in DWT Domain," Signal Processing, vol. 88, Issue 1, Jan. 2008, pp. 117-130.

* cited by examiner

METHOD FOR GENERATING MEDIA INFORMATION, TERMINAL, SERVER, AND AHS SYSTEM

This application is a continuation of International Application No. PCT/CN2013/074597, filed on Apr. 24, 2013, which claims priority to Chinese Patent Application No. 201210133456.6, filed on May 2, 2012, both of which are hereby incorporated by reference in their entireties.

TECHNICAL FIELD

The present invention relates to the field of communications technologies, and in particular, to a method for generating media information, a terminal, a server, and an adaptive streaming AHS (Adaptive HTTP Streaming) system.

BACKGROUND

Currently, media files such as audio, video, and multimedia files are transmitted on the Internet based on an AHS (Adaptive HTTP Streaming) technology of a streaming service of HTTP (Hyper Text Transfer Protocol). In a media distribution process, such as television reception based on a set top box, of a terminal after the terminal receives a media file, an end user or a receiver that has paid for media content may illegally redistribute the received content to an unauthorized user or directly share the received content on the Internet. This distribution behavior is one of piracy behaviors.

However, in a process of implementing a pirate tracing technology in the prior art, a method for tracing a malicious distributor is: embedding a unique identifier related to a terminal (receiver) into media content, so that each terminal (receiver) receives a different media copy. When a terminal (receiver) maliciously distributes the content, the malicious distributor can be determined by detecting an identifier in the content, which is implemented in two different manners:

One manner is based on a server. A server end embeds and sends the media content according to a request of a user, and sends a media copy to each user. However, in this method, the server end needs to process the media content in real time, respond to requests of all users, and generate and distribute a different media copy to each user; for the server end, concurrent load is excessively large. Therefore, in the event of a large user quantity and limited bandwidth, a problem of tracing the media information in an AHS system, that is, a problem of tracing a pirate that pirates the media information, cannot be resolved.

The other manner is based on the terminal. The server end broadcasts only one type of media data stream, a client (terminal) is responsible for selecting a corresponding media data segment according to its own identifier and performing decryption and decoding, so as to obtain different media data.

However, in this method, the server end needs to broadcast two copies of a media code stream, instead of basing on an active request of an end user; therefore, the technology cannot resolve a problem related to pirating of media information in the AHS system and tracing of a pirate that pirates the media information.

It can be learned from the foregoing description that, the pirate tracing technology in the prior art not only has a problem that embedding of an identifier cannot be efficiently implemented under limiting conditions of a large user quantity and limited bandwidth, but also is not applicable to a current AHS system, and media information that can support pirate tracing cannot be generated.

SUMMARY

In view of this, embodiments of the present invention aim to provide a method for generating media information, a terminal, a server, and an adaptive streaming AHS (adaptive HTTP streaming) system, so as to solve a problem that media information supporting pirate tracing cannot be generated in an AHS service system in the prior art.

To achieve the foregoing objective, the embodiments of the present invention provide the following technical solutions:

A method can be used for generating media information. Media code streams of m types of code rate, which are generated by adaptive streaming AHS, are divided into h groups and code stream group information is generated. The code rate is used to indicate a code stream of different quality, and the code stream is formed by multiple code stream segments. A tracing code is embedded into the code stream segments. The tracing codes are used to generate a traceable code stream corresponding to the code stream. The tracing codes embedded into the code stream segments and the code stream group information are stored in a media presentation description MPD file. A traceable media presentation description TMPD file is generated. A request of a terminal for media content is received and the TMPD to the terminal.

A server includes an adaptive streaming media code stream unit, which is configured to generate media code streams of m types of code rate. A code stream group information unit is configured to divide the media code streams of m types of code rate, which are generated by the adaptive streaming AHS media code stream unit, into h groups and generate code stream group information. The code rate is used to indicate a code stream of different quality, and the code stream is formed by multiple code stream segments. A traceable code stream unit is configured to embed a tracing code into the code stream segments. The tracing codes are used to generate a traceable code stream corresponding to the code stream. A media presentation description TMPD file unit that carries a tracing code is configured to store, in a media presentation description MPD file, the tracing codes embedded into the code stream segments and generated by the traceable code stream unit and the code stream group information generated by the code stream group information unit. This unit is also configured to generate a traceable media presentation description TMPD file. And user response unit is configured to generate and store a terminal identifier, receive a request of a terminal for media content, and send the TMPD to the terminal.

A terminal and end user identifier unit is configured to save a terminal identifier of an end user. A parsing unit is configured to receive and parse a media presentation description TMPD file that carries a tracing code. Adaptive switching unit's configured to generate, according to the terminal identifier, a parsing result of the TMPD, and a terminal processing capability and/or a network environment, code stream request information to be fed back to a server end.

An adaptive media system includes the foregoing server and terminal.

It can be learned from the foregoing technical solutions that, compared with the prior art, the embodiments of the present invention disclose a method for generating media information, a terminal, a server, and an AHS system. Media code streams of m types of code rate, which are generated by an AHS system, are divided into h groups, and a tracing code is embedded into code stream segments of each group. The tracing codes and media code stream group information are stored in an MPD. In a downloading process of a terminal, tracing of an end user that downloads media data is implemented by using a tracing code. Media information that carries a tracing code can be generated in the foregoing process; that is, based on the foregoing process, media information that supports pirate tracing can be generated, and a problem of pirate tracing in an AHS service can be resolved.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely the embodiments of the present invention, and a person of ordinary skill in the art may still derive other drawings from these accompanying drawings without creative efforts.

DETAILED DESCRIPTION OF ILLUSTRATIVE EMBODIMENTS

For reference and clarity, descriptions, and acronyms or abbreviations of technical terms used in the following text are summarized as follows:

HTTP: Hyper Text Transfer Protocol, Hypertext Transfer Protocol;

AHS: Adaptive HTTP Streaming, adaptive HTTP streaming;

MPD: Media Presentation Description, media presentation description file; and

TMPD: Traceable Media Presentation Description, traceable media presentation description file.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It can be learned from the background that, all pirate tracing technologies in the prior art are not applicable to an AHS system, and a problem of pirate tracing in the AHS system cannot be resolved. According to this requirement, the embodiments of the present invention disclose a pirate tracing method that is applicable to an AHS system, a terminal, a server, and an AHS system. Specific content is described in detail by using the following embodiments.

A core idea of the embodiments of the present invention is that: on a server end, media code streams of m types of code rate, which are generated by an AHS system, are divided into h groups, a tracing code is embedded into segments of each group, and the tracing codes and media code stream group information are stored in an MPD. On a terminal, after downloading the MPD, the terminal selects and downloads a media code stream of corresponding quality according to a processing capability of the terminal itself, a current network environment, an identifier of the terminal, and the tracing codes and the media code stream group information in the MPD. The terminal determines uniqueness of the downloaded media code stream by using the identifier; when an end user distributes the media code stream, a tracing code in the media code stream may be used to determine an end user that performs distribution, thereby implementing tracing of the end user.

Embodiment 1

Figure 1A:
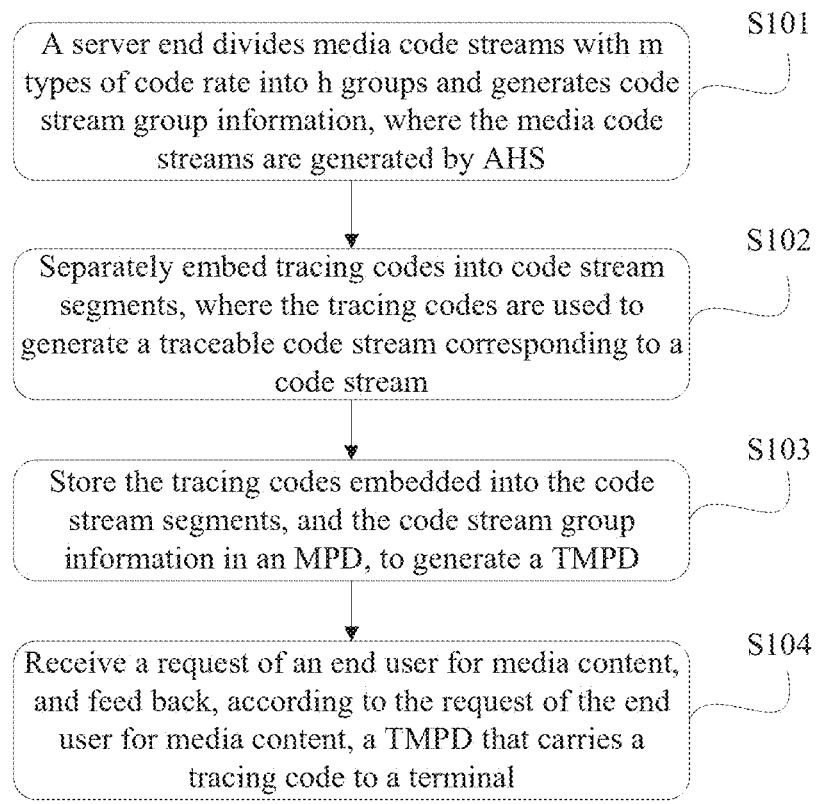
FIG. 1a is a flowchart of a method, for generating media information, disclosed in Embodiment 1 of the present invention.

Refer to FIG. 1a provides a flowchart of a method for generating media information as disclosed in Embodiment 1 of the present invention. The method mainly includes the following steps.

Step S101: A server end divides media code streams of m types of code rate into h groups and generates code stream group information, where the media code streams are generated by AHS.

Figure 2:
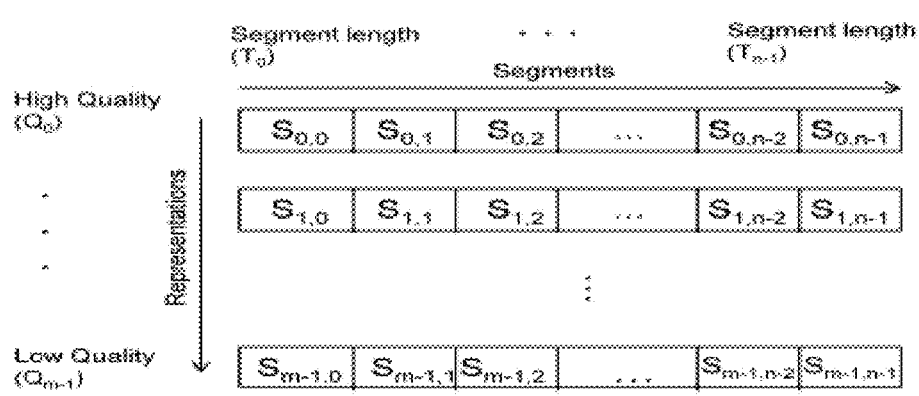
FIG. 2 is a schematic structural diagram of media data code streams of m types of code rate that are disclosed in an embodiment of the present invention.

When step S101 is performed, media data code streams of m types of code rate are generated on the server end, where the code rate is equivalent to quality of a code stream. M types of code rate corresponding to a generated code stream structure shown in FIG. 2 include at least a high-quality code rate, a medium-quality code rate, and a low-quality code rate, and m types of quality that correspond to the m types of code rate respectively are indicated as: $Q0$, $Q1$, $Q2$, ..., and $Qm-1$ according to a descending order of quality; each type of code stream may be divided into n segments according to a different length of time, and the n segments in FIG. 2 correspond to lengths of time: $T0$, $T1$, $T2$, ..., and $Tn-1$ respectively.

In a process of grouping the media data code streams of m types of code rate, according to code stream quality/a code stream similarity principle, the m types of quality are further divided to generate h groups corresponding to h types of quality, the h groups include code streams corresponding to m/h types of code rate, and each code stream corresponds to a different code rate. The h is greater than or equal to 1, the m indicates m different types of quality, a value of the m/h is $2^x$, and the x is greater than or equal to 1.

Code streams of m/h types of code rate, which are included in any one of the h groups, can be further divided into n segments, that is, each code stream includes n segments, where the n is greater than 0. In this embodiment of the present invention, the n is 6.

The media code streams of m types of code rate (quality) are divided layer by layer by performing step S101, and m code streams are divided into h groups, so that each group includes m/h code streams (code stream segments). In a process of embedding tracing codes after the foregoing further subdivision, a tracing function can be better supported.

Step S102: Embed a tracing code into the code stream segments, where the tracing code is used to generate a traceable code stream corresponding to the code stream.

Step S102 is performed on the h groups of code streams that are divided in the foregoing step S101. A corresponding tracing code is embedded into each group of code stream segments, where the tracing code is used to generate the traceable code stream corresponding to information about the code stream. In a process of embedding the tracing codes, different tracing codes need to be embedded into different code streams of a same group; however, for different code stream segments divided from a code stream of a same code rate among m/h types of code streams of each group, a same or different tracing code is embedded into the code stream segments, and a length of the tracing code embedded into each code stream segment is K, where K=x, and the x is determined by code stream grouping. In addition, an embedding method may be implemented by using a watermark algorithm.

It should be noted that the tracing code embedded into each code stream or code stream segment is unique in each code stream or code stream segment.

Step S103: Store the tracing codes embedded into the code stream segments, and the code stream group information in an MPD, and generate a traceable media presentation description TMPD file.

Step S103 is performed to store the generated traceable code stream in the MPD and generate the media presentation description TMPD file that carries a tracing code. Generally, the MPD further includes relevant information such as a code rate, quality, an address, and authorization information of a media code stream segment, and all the relevant information is information that can be traced.

It should be noted that, in order to further improve security, each code stream segment in the traceable code stream generated in the foregoing step S102 may also be encrypted first, and then each encrypted code stream segment of the traceable code stream is stored. Specifically, a different encryption manner may be used for each code stream or code stream segment.

Step S103 is performed to store every traceable code stream in the MPD; because the traceable code stream corresponds to the code stream group information, actually, a tracing code and code stream group information that correspond to each media code stream segment are stored in the MPD to generate a corresponding TMPD. The following Table 1 shows a typical TMPD.

SegmentTraceCode (Ci), i=0 to n−1 indicates a tracing code corresponding to a code stream segment; and RepresentationGroupNumberk (Rk), k=0 to m−1 indicates a group corresponding to a code stream of quality.

Figure 3:
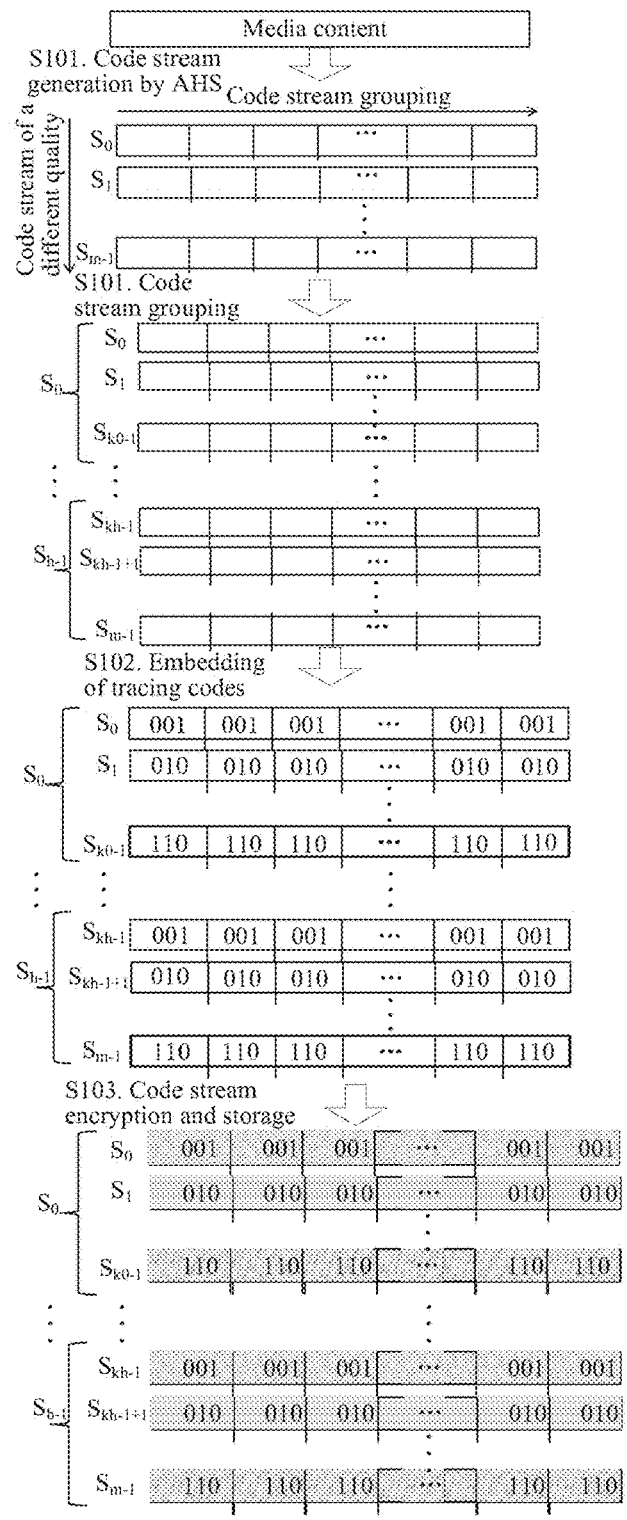
FIG. 3 is a schematic diagram of code streams generated in a process of performing step S101 to step S103 disclosed in Embodiment 1 of the present invention.

For example, a code stream generated in a process of performing the foregoing step S101 to step S103 is shown in FIG. 3. As shown in FIG. 3, tracing codes of code stream segments corresponding to a code stream (code stream corresponding to a first line shown in FIG. 3) of first quality are: C0=C1= . . . =Cn−1='001'.

Generally, there is no special requirement for tracing codes of different media segments; therefore, the tracing codes may also be: C0 ≠C1 ≠ . . . ≠Cn−1. The structure shown in FIG. 3 is a preferred structure in the present invention.

TABLE 1

| Element or Attribute Name |
|---|
| TMPD |
|     baseURL |
|     ProgramInformation |
|         moreInformationURL |
|         Period |
|         baseURL |
|             sourceUrlTemplatePeriod |
|         Representation$_i$ (i = 0 to m−1) |
|             RepresentationGroupNumber$_k$ (R$_k$), k = 0 to m−1 |
|             RepresentationLicense$_j$(L$_j$) (j = 0 to m−1) |
|             \| Segment$_0$ |
|             \| segmentQuality (Q$_0$) |
|             \| segmentTraceCode (C$_0$) |
|             \| ... |
|             \| Segment$_{n-1}$ |
|             \| segmentQuality (Q$_{n-1}$) |
|             \| segmentTraceCode (C$_{n-1}$) |
|             \| ... |

Step S104: Receive a request of an end user for media content, and feed back, according to the request of the end user for media content, the TMPD that carries a tracing code to a terminal.

In a process of performing step S104, when receiving the request of the terminal for media content, the server end feeds back the TMPD that carries a tracing code to the terminal, that is, feeds back a TMPD file corresponding to the requested media content to the terminal.

The TMPD is related only to the media content and is unrelated to the terminal, and different media content may correspond to different TMPDs. The end user that sends the request for media content to the server end also has a corresponding unique terminal identifier. If different terminals request same media content, different terminals receive a same TMPD.

Regarding a source of the terminal identifier, generally, a unique terminal identifier that indicates an identity of the terminal is stored inside the terminal. In another case, when the terminal itself does not have an identifier and the terminal requests media information or media content from the server end, the server end generates, according to known information of the end user, a corresponding unique terminal identifier that indicates an identity of the terminal that sends the request.

The terminal identifier may be a binary sequence (a sequence of 0 or 1), and a length should be not less than L bits. When L=32, the number of end users supported by a length of the binary sequence of the terminal identifier needs to be greater than or equal to 2 L. For the terminal identifier, a corresponding identifier may be generated for each end user by using a random number generation method and is stored in the server end and/or the terminal. The terminal identifier of an end user may also be written in advance when a device is purchased, and may also be transmitted through a network and written into the terminal when the user requests a service.

Figure 1B:
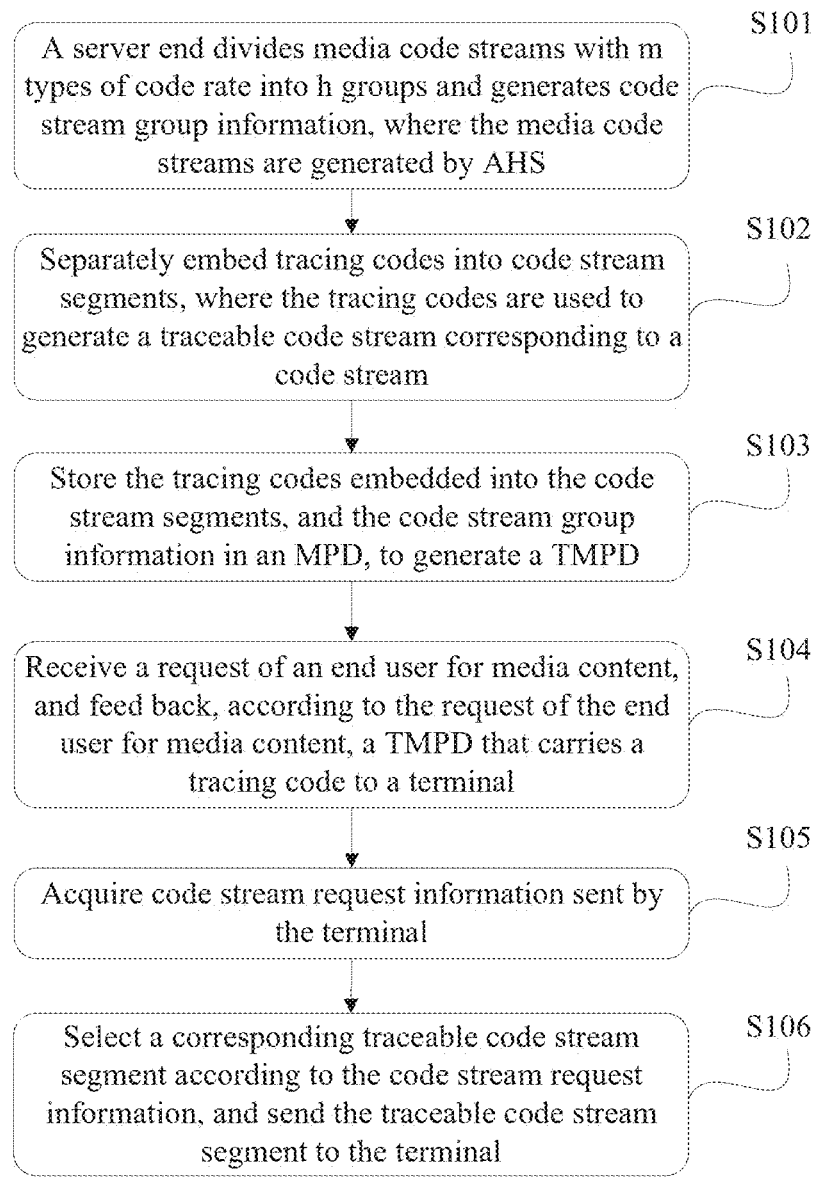
FIG. 1b is a flowchart of another method, for generating media information, disclosed in Embodiment 1 of the present invention.

The traceable media presentation description TMPD file may be generated by using the foregoing process in this embodiment of the present invention, and the traceable media presentation description TMPD file is sent to the terminal when the request of the terminal for media content is received. On this basis, the present invention further discloses a process of sending code stream request information after the terminal receives the TMPD. For details, refer to FIG. 1b, which is further added with step S105 and step S106 on a basis of FIG. 1a.

Step S105: Acquire code stream request information sent by the terminal, where the code stream request information is obtained by the terminal according to the terminal identifier and a parsing result of the TMPD. The terminal identifier or a part of the terminal identifier is consistent with a tracing code.

Figure 4:
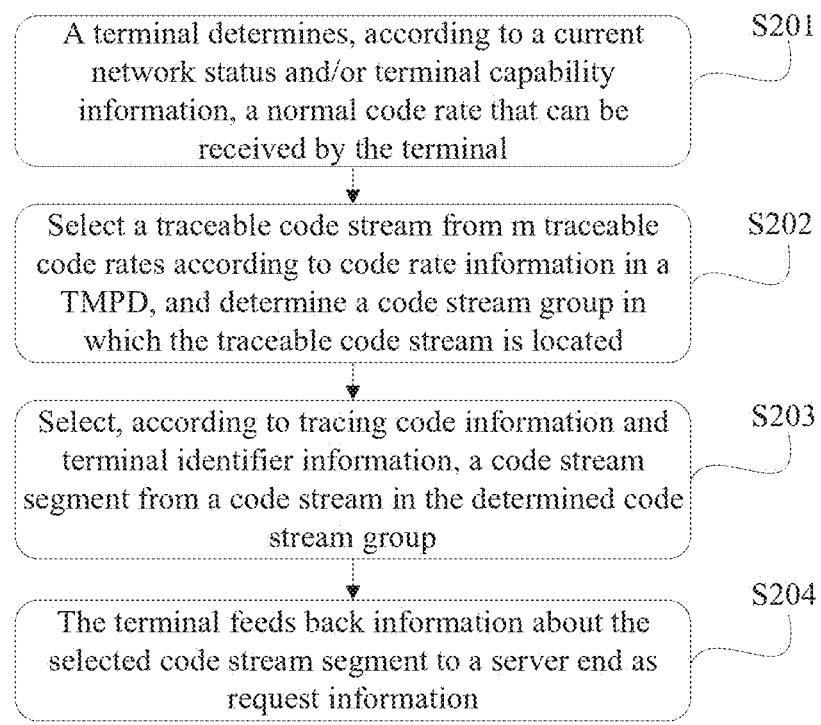
FIG. 4 is a flowchart of generation, of code stream request information in a terminal, disclosed in Embodiment 1 of the present invention.

In a process of performing step S105, code stream request information fed back by the terminal is received. A process of generating the code stream request information in the terminal is shown in FIG. 4, and the process mainly includes step S201 to step S204:

Step S201: The terminal determines, according to a current network environment and/or terminal capability information, a code rate of code streams that can be normally received by the terminal.

Step S202: The terminal selects a traceable code stream of which the code rate is not greater than and close to the normal code rate from code streams corresponding to m traceable code rates according to code rate information in the received TMPD, and acquires a code stream group to which the traceable code stream belongs, that is, determines a group to which the traceable code stream belongs among the h groups of code streams.

Step S203: Select, according to tracing code information in the received TMPD and terminal identifier information of the terminal, a code stream segment from a code stream in the acquired code stream group, where a tracing code included in the code stream segment is the same as the terminal identifier. That is, the tracing code included in the selected code stream segment is consistent with the terminal identifier or a part of information about the terminal identifier.

Step S204: The terminal feeds back information about the selected code stream segment, that is, an address corresponding to the code stream segment, to the server end as request information. The address corresponding to the code stream segment is acquired from the TMPD, and the address corresponding to the code stream segment is a storage address, included in the TMPD on the server end, of the code stream.

After the foregoing step S201 to step S204 are performed, the code stream request information can be acquired.

Step S106: Select a code stream segment in a corresponding traceable code stream according to the code stream request information, and send the code stream segment to the terminal.

In a process of performing step S106, the server end searches for and selects a corresponding traceable code stream segment according to an address of the code stream segment in the received code stream request information that is fed back by the terminal, and sends the corresponding traceable code stream segment to the terminal.

By using the foregoing method disclosed in this embodiment of the present invention, after downloading an MPD, a terminal selects and downloads a media code stream of corresponding quality according to a processing capability of the terminal itself, a current network environment, an identifier of the terminal, and tracing codes and media code stream group information in the MPD. The terminal determines uniqueness of the downloaded media code stream by using the identifier; when an end user distributes the media code stream, a tracing code in the media code stream may be used to determine an end user that performs distribution, thereby implementing tracing of the end user.

Embodiment 2

Figure 5:
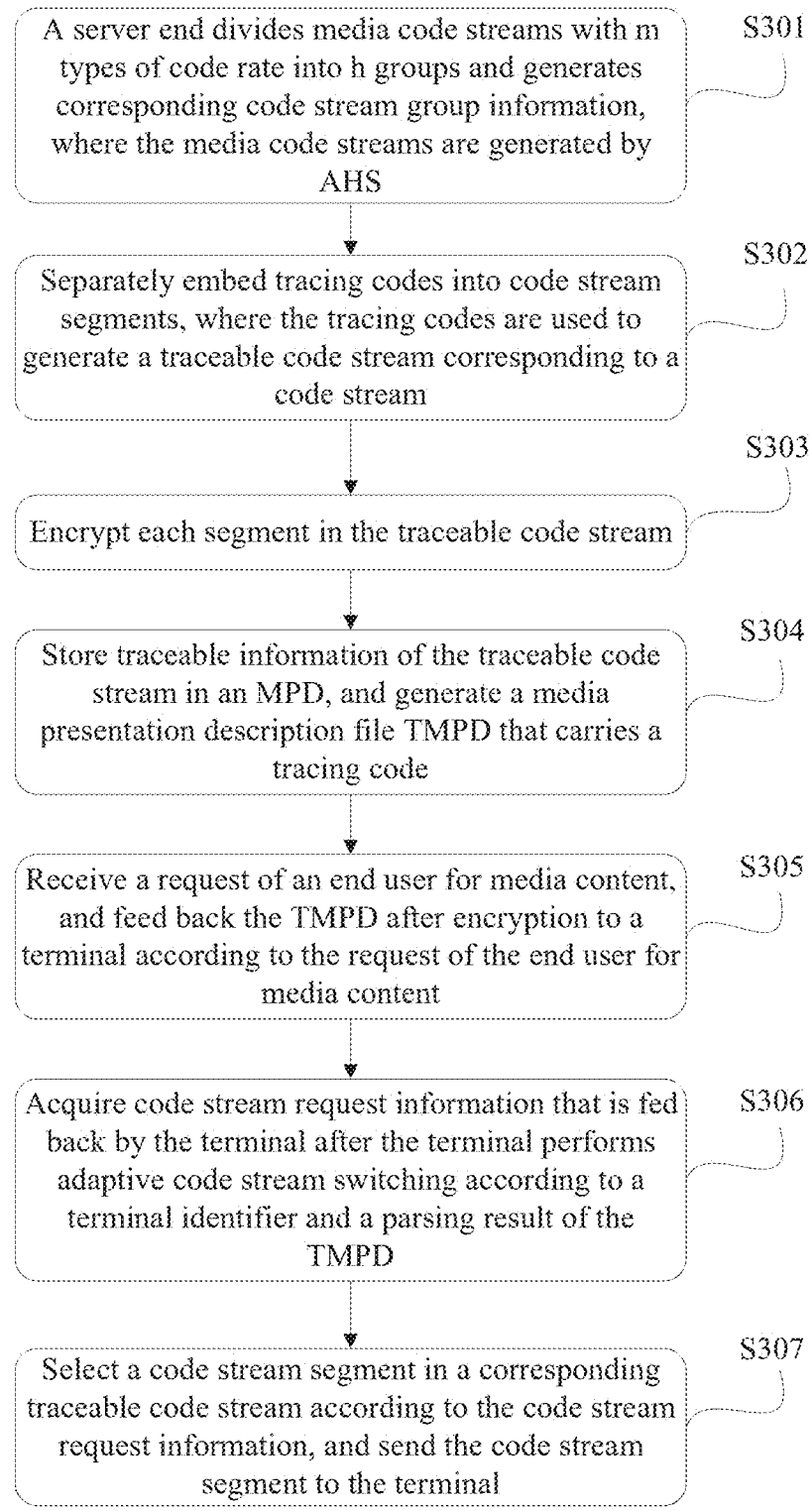
FIG. 5 is a flowchart of a method, for generating media information, disclosed in Embodiment 2 of the present invention.

FIG. 5 provides a flowchart of a method for generating media information as disclosed in Embodiment 2 of the present invention. The method mainly includes the following steps.

Step S301: A server end divides media code streams of m types of code rate into h groups and generates corresponding code stream group information, where the media code streams are generated by AHS.

Step S302: Embed a tracing code into code stream segments, where the tracing code is used to generate a traceable code stream corresponding to a code stream.

A specific execution process of the foregoing step S301 and step S302 is basically consistent with that of step S101 and step S102 in the foregoing Embodiment 1, which can be referenced mutually. Details are not described herein again.

Step S303: Encrypt each code stream segment in the traceable code stream.

When step S303 is performed to encrypt each code stream segment in the traceable code stream, specifically, a different encryption manner may be used for each code stream or code stream segment.

Step S304: Store the tracing codes embedded into the code stream segments, and the code stream group information in an MPD, and generate a traceable media presentation description TMPD file.

In step S304, the code stream group information and traceable information of the traceable code stream are stored in the MPD, where the traceable information is encrypted in each code stream segment. Generally, the MPD includes information such as a code rate and an address of a code stream segment of a media code stream.

For example, in an MPD shown in Table 2, "Representation" indicates a code stream of certain quality, "RepresentationLicense" indicates authorization information (such as decryption information) corresponding to a code stream, and "segmentQuality" indicates quality or a code rate of a code stream segment.

After the code stream segments in the traceable code stream are encrypted, step S304 is performed to store the tracing code corresponding to each media code stream segment and the code stream group information in the MPD to generate a corresponding TMPD. With respect to a specific structure of the TMPD, a typical structure is given in the foregoing Embodiment 1, and details are not described herein again. In this embodiment disclosed in the present invention, in order to improve security, a provided TMPD file is not disclosed or transmitted to a terminal until the TMPD file is further encrypted.

TABLE 2

```
Element or Attribute Name

MPD
    baseURL
    ProgramInformation
        moreInformationURL
            Period
                baseURL
                sourceUrlTemplatePeriod
                Representation_i(i = 0 to m-1)
                    RepresentationLicense_i (L_i) (j = 0 to m-1)
                    | Segment_0
                    |   segmentQuality (Q_0)
                    |   ...
                    | Segment_{n-1}
                    |   segmentQuality (Q_{n-1})
                    |   ...
```

Step S305: Receive a request of an end user for media content, and feed back an encrypted TMPD to the terminal according to the request of the end user for media content.

A receiving and feedback process of step S305 is the same as that of step S204 disclosed in the foregoing Embodiment 1, and details are not described herein again.

Step S306: Acquire code stream request information that is fed back by the terminal after the terminal performs adaptive code stream switching according to a terminal identifier and a parsing result of the TMPD.

Figure 6:
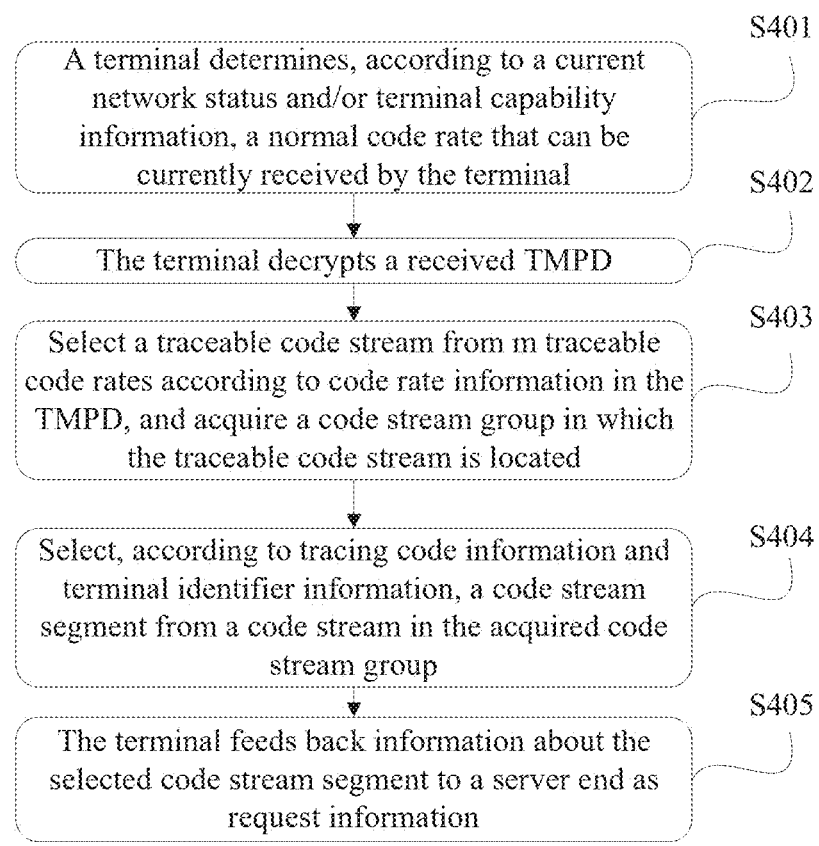
FIG. 6 is a flowchart of generation, of code stream request information in a terminal, disclosed in Embodiment 2 of the present invention.

The TMPD is encrypted in this embodiment disclosed in the present invention; therefore, for the code stream request information that is fed back by the terminal and acquired by the server end in step S306, a process of acquiring the code stream request information in the terminal is shown in FIG. 6 and mainly includes:

Step 401: The terminal determines, according to a current network environment and/or a media data processing capability of the terminal, a normal code rate of a code stream that can be currently received by the terminal.

The media data processing capability is generally acquired by reading hardware configuration information of the terminal, and the current network environment refers to a bandwidth condition of a network, which can be acquired by reading network configuration information. The normal code rate of a code stream that can be currently received by the terminal can be determined in two manners: one is to determine, by using one of the foregoing two conditions, the normal code rate of a code stream that can be currently received by the terminal; and the other is to determine, by using a smaller or lower condition after the foregoing two conditions are compared, the normal code rate of a code stream that can be currently received by the terminal.

Step S402: The terminal decrypts a received TMPD, and parses a parameter included in the received TMPD. A parsing manner can be briefly expressed as: extracting, according to a parameter ID, the parameter and a value corresponding to the parameter.

Step S403: The terminal selects a traceable code stream of which the code rate is not greater than and close to the normal code rate from code streams corresponding to m traceable code streams according to code rate information in the received TMPD, and acquires a code stream group to which the traceable code stream belongs, that is, determines a group to which the traceable code stream belongs among the h groups of code streams.

Step S404: Select, according to tracing code information in the received TMPD and terminal identifier information of the terminal, a code stream segment from a code stream in the acquired code stream group, where a tracing code included in the code stream segment is the same as the terminal identifier. That is, the tracing code included in the selected code stream segment is consistent with the terminal identifier or a part of information about the terminal identifier.

Step S405: The terminal feeds back information about the selected code stream segment, that is, an address corresponding to the code stream segment, to the server end as request information. The address corresponding to the code stream segment is acquired from the TMPD, and the address corresponding to the code stream segment is a storage address, included in the TMPD on the server end, of the code stream.

After the foregoing step S401 to step S405 are performed, the code stream request information can be acquired.

Step S307: Select a code stream segment in a corresponding traceable code stream according to the code stream request information, and send the code stream segment to the terminal.

The foregoing process is basically the same as the process disclosed in Embodiment 1 of the present invention, which can be referenced mutually.

By using the foregoing process, media code streams of m types of code rate, which are generated by an AHS system, may also be divided into h groups, and different tracing codes are separately embedded into code stream segments of each group of code streams; the tracing codes and media code stream group information are stored in an MPD; and in a downloading process of a terminal, tracing of an end user that downloads media data is implemented by using a tracing code. Media information that carries a tracing code can be generated in the foregoing process; that is, based on the foregoing process, media information that supports pirate tracing can be generated, and a problem of pirate tracing in an AHS service can be implemented.

In addition, a transmitted TMPD may be encrypted to further improve security performance in a transmission process.

In addition, it should be noted that in the foregoing Embodiment 1 and Embodiment 2, a TMPD can be transmitted by the server end to a terminal in an HTTP downloading manner.

Embodiment 3

Based on traceable media information generated in the foregoing Embodiment 1 and Embodiment 2 that are disclosed in the present invention, when a terminal illegally forwards, uploads, and distributes received media information, forwarding is actually illegal. In particular, when the terminal spreads the media information to a public network to cause extensive spreading, a loss of a server end is caused. However, based on the traceable media information generated in the foregoing Embodiment 1 and Embodiment 2 that are disclosed in the present invention, the server end can implement pirate tracing, that is, tracing of a terminal that illegally spreads the media information, and determine a terminal by which illegally spread information is illegally spread. Therefore, when the server end detects a media code stream corresponding to the media information on another terminal or network, a specific pirate tracing process is:

Firstly, a code stream segment in a traceable code stream in the media code stream is captured. Secondly, a terminal identifier is determined according to a tracing code embedded into the code stream segment. Finally, a terminal that illegally distributes the media code stream is traced and acquired according to the terminal identifier.

A basis for performing the foregoing process is as follows: It can be learned from that a tracing code is embedded into each traceable code stream segment, which is disclosed in the foregoing Embodiment 1 and Embodiment 2, because that the tracing code is consistent with a terminal identifier of a receiving terminal, a corresponding terminal identifier can be learned from the tracing code embedded into the traceable code stream segment; and finally, the server end can find, according to the terminal identifier, a unique terminal corresponding to the terminal identifier. Therefore, a pirate (terminal) that illegally distributes the media code stream or media information can be determined.

By using the foregoing process, based on traceable media information generated in Embodiment 1 and Embodiment 2 of the present invention, tracing of an end user that downloads media data is implemented by using a tracing code in the traceable media information. When the end user pirates and spreads the media data, pirate tracing can further be implemented, that is, a problem of pirate tracing in an AHS service is implemented, and a loss of a server end is reduced.

Embodiment 4

For a method, for generating media information, specifically described in the foregoing embodiments disclosed in the present invention, embodiments of the present invention further separately disclose a corresponding server and terminal that perform the foregoing method, and a specific embodiment is given below and described in detail.

Figure 7:
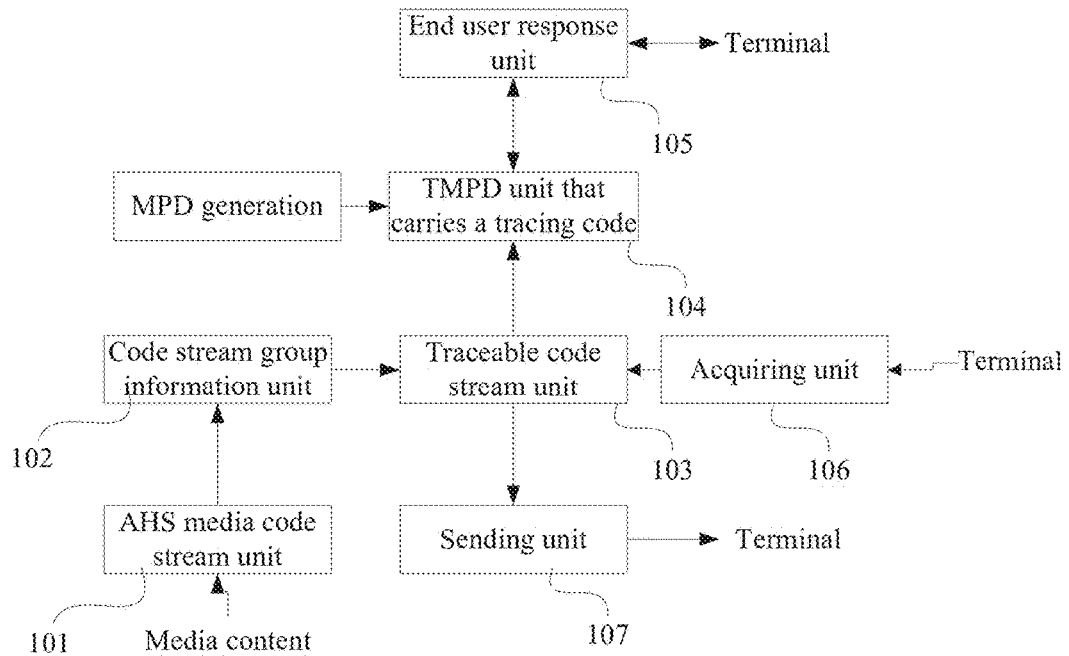
FIG. 7 is a schematic structural diagram of a server end disclosed in Embodiment 4 of the present invention.

Refer to FIG. 7, which is a schematic structural diagram of a server end disclosed in this embodiment of the present invention, and the server end mainly includes an AHS media code stream unit 101, a code stream group information unit 102, a traceable code stream unit 103, a TMPD unit 104 that carries a tracing code, an end user response unit 105, an acquiring unit 106, and a sending unit 107.

The AHS media code stream unit 101 is configured to generate media code streams of m types of code rate, where the m types of code rate include at least a high-quality code rate, a medium-quality code rate, and a low-quality code rate. For details, reference may be made to related content in Embodiment 1 and Embodiment 2 of the present application.

The code stream group information unit 102 is configured to divide the media code streams of m types of code rate into h groups and generate code stream group information, where the media code streams are generated by the AHS media code stream unit 101.

The code rate is used to indicate a code stream of different quality, and the code stream is formed by multiple code stream segments. Specifically, the h groups include code streams corresponding to m/h types of code rate, and each code stream corresponds to a different code rate; the code stream includes n segments, the h is greater than or equal to 1, and the n is greater than or equal to 1.

It should be noted that the code stream group information unit 102 divides groups according to code stream quality/a code stream similarity principle, and each group includes m/h types of code stream, where the m indicates m different types of quality, a value of the m/h is $2^x$, and the x is greater than or equal to 1.

The traceable code stream unit 103 is configured to embed a tracing code into the code stream segments, where the tracing code is used to generate a traceable code stream corresponding to the code stream.

It should be noted that when embedding the tracing codes, the traceable code stream unit 103 embeds different tracing codes into different code streams of a same group.

For different segments divided from a code stream of a same code rate among m/h types of code stream of each group, a same or different tracing code is embedded into the segments, where a length of the tracing code embedded into each segment is K=x, and the x is determined by code stream grouping.

The TMPD unit 104 that carries a tracing code is configured to store, in a media presentation description MPD file, the tracing codes embedded into the code stream segments and generated by the traceable code stream unit 103 and the code stream group information generated by the code stream group information unit 102, and configured to generate a TMPD.

The end user response unit 105 is configured to generate and store a terminal identifier, receive a request of an end user for media content, and send the TMPD that carries a tracing code to the terminal.

The end user response unit 105 mainly includes: a first receiving module, a generating and storing module, and a feedback module.

The first receiving module is configured to receive the request of the end user for media content. The generating and storing module is configured to generate, according to valid information such as user registration information carried in the terminal request, a unique terminal identifier corresponding to the terminal when the terminal does not have a terminal identifier. The feedback module is configured to feed back the TMPD that carries a tracing code to the terminal.

The acquiring unit 106 is configured to acquire code stream request information that is fed back by the terminal after the terminal performs adaptive code stream switching according to the terminal identifier and a parsing result of the TMPD.

The sending unit 107 is configured to select a code stream segment in a corresponding traceable code stream according to the code stream request information, and send the code stream segment to the terminal.

The sending unit 107 includes: a second receiving module and a sending module.

The second receiving module is configured to receive the code stream request information. The code stream request information includes at least an address of a code stream. The sending module is configured to send a traceable code stream segment corresponding to the code stream request information (code stream address) to the terminal.

It should be noted that, in order to further improve security in a transmission process, an encrypting unit may further be added on the server end, where the encrypting unit is configured to encrypt an MPD file, so that an encrypted TMPD file is generated, stored, and/or transmitted. Specifically, the encrypting unit is configured to encrypt each of the code stream segments in the traceable code stream stored in the MPD. For specific execution processes in all the foregoing units and modules, reference may be made to content recorded in corresponding parts in the foregoing Embodiment 1 and Embodiment 2.

By using a server end that can implement the foregoing embodiments disclosed in the present invention, media code streams of m types of code rate are divided into h groups, and different tracing codes are separately embedded into code stream segments of each group of code streams; the tracing codes and media code stream group information are stored in an MPD; and in a downloading process of a terminal, tracing of an end user that downloads media data is implemented by using a tracing code. Media information that carries a tracing code can be generated in the foregoing process; that is, based on the foregoing process, media information that supports pirate tracing can be generated, and a problem of pirate tracing in an AHS service can be implemented.

Embodiment 5

Figure 8:
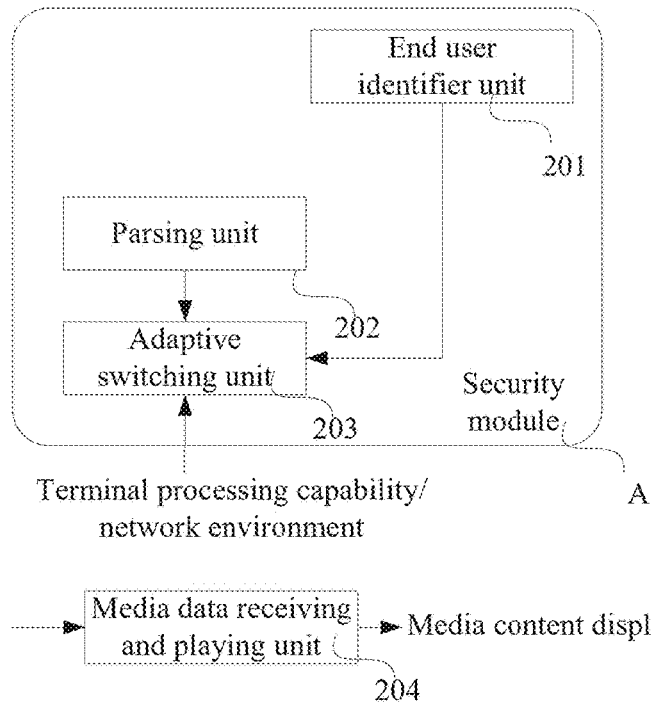
FIG. 8 is a schematic structural diagram of a terminal, corresponding to the foregoing server end, disclosed in Embodiment 5 of the present invention.

Refer to FIG. 8, which is a schematic structural diagram of a terminal, corresponding to the foregoing server end, disclosed in this embodiment of the present invention, and the terminal mainly includes: an end user identifier unit 201, a parsing unit 202, and an adaptive switching unit 203. The foregoing units in the terminal may be collectively called a security module A.

The end user identifier unit 201 is configured to save a terminal identifier of an end user. The terminal identifier may be generated by using a random number generation method. The terminal identifier in the end user identifier unit 201 may be written in advance when a device is purchased, and may also be transmitted through a network and written into the terminal when a user requests a service.

The parsing unit 202 is configured to receive and parse a TMPD.

The adaptive switching unit 203 is configured to perform adaptive code stream switching according to the terminal identifier, a parsing result of the TMPD, and a terminal processing capability/network environment. A corresponding code stream segment is selected by using the switching unit.

In addition, the terminal disclosed in this embodiment of the present invention further includes a media data receiving and playing unit 204, configured to receive a code stream segment sent by the server end and play media content corresponding to the code stream segment.

The foregoing adaptive switching unit 203 mainly includes a determining module, a first selecting module, a second selecting module, and a requesting module.

The determining module is configured to determine, according to the network environment and/or information about a media data processing capability of the terminal, a code rate of code streams that can be normally received by the terminal;

The media data processing capability is generally acquired by reading hardware configuration information of the terminal, and the current network environment refers to a bandwidth condition of a network, which can be acquired by reading network configuration information. The normal code rate of a code stream that can be currently received by the terminal can be determined in two manners: one is to determine, by using one of the foregoing two conditions, the normal code rate of a code stream that can be currently received by the terminal; and the other is to determine, by using a smaller or lower condition after the foregoing two conditions are compared, the normal code rate of a code stream that can be currently received by the terminal.

The first selecting module is configured to select a traceable code stream of which the code rate is not greater than and close to the normal code rate from code streams corresponding to m traceable code streams according to code rate information parsed from the TMPD, and acquire a code stream group to which the traceable code stream belongs. That is, a traceable code stream, of which a code rate is the same as or closest to the normal code rate, is selected from m traceable code rates, and a group to which the traceable code stream belongs among the h groups of code streams is determined, where the group belongs to one of the h groups.

The second selecting module is configured to select a code stream segment from code streams of the acquired code stream group, where the code stream segment includes a tracing code that is consistent with the terminal identifier or a part of information about the terminal identifier.

The requesting module is configured to send information about the code stream segment, that is, an address corresponding to the code stream segment, to the server end as code stream request information, where the address corresponding to the code stream segment is a storage address, included in the TMPD on the server end, of the code stream.

In addition, corresponding to the foregoing server end that encrypts the TMPD, a decrypting unit may further be added in the terminal disclosed in this embodiment of the present invention before the parsing unit.

The decrypting unit is configured to: when a received TMPD is encrypted, decrypt and then send the TMPD to the parsing unit 202 for parsing.

Only processes of parsing the TMPD and performing adaptive switching are briefly described in this embodiment. For specific and detailed content, reference may be made to the foregoing method Embodiment 1 and Embodiment 2 separately, and details are not described herein again. The adaptive switching process is described by using only one example:

Firstly, according to the current network environment and/or the information about the media data processing capability of the terminal, it is determined that the code rate of code streams that can be normally received by the terminal is B.

Secondly, a code stream that is closest to B and not greater than B is selected from code streams of m types of quality in the TMPD according to SegmentQuality(Q) in a TMPD file shown in the foregoing Table 1, and is assumed as $Q^B$, and an available group is determined from h code stream groups, where the group is obtained by searching the TMPD file. That is, a parameter RepresentationGroupNumber corresponding to a code stream that meets SegmentQuality (Q)=$Q^B$ is selected from the TMPD file and herein is assumed as $R^B$.

Then, a corresponding code stream group (m/h code stream segments) is found by using a code stream group number $R^B$, and a code stream segment that needs to be selected is determined by comparing a terminal identifier of an end user that currently requests a media data stream with a tracing code in a code stream segment. The tracing code of the code stream segment is obtained by searching the TMPD. A selection principle is that the terminal identifier and the tracing code are the same.

When a length L of an identifier of an end user is different from a length K of a tracing code in a code stream segment, the identifier is divided into L/K groups, and K bits in each group are compared. In this way, only L/K consecutive code stream segments are required to complete tracing of an identifier.

Figure 9:
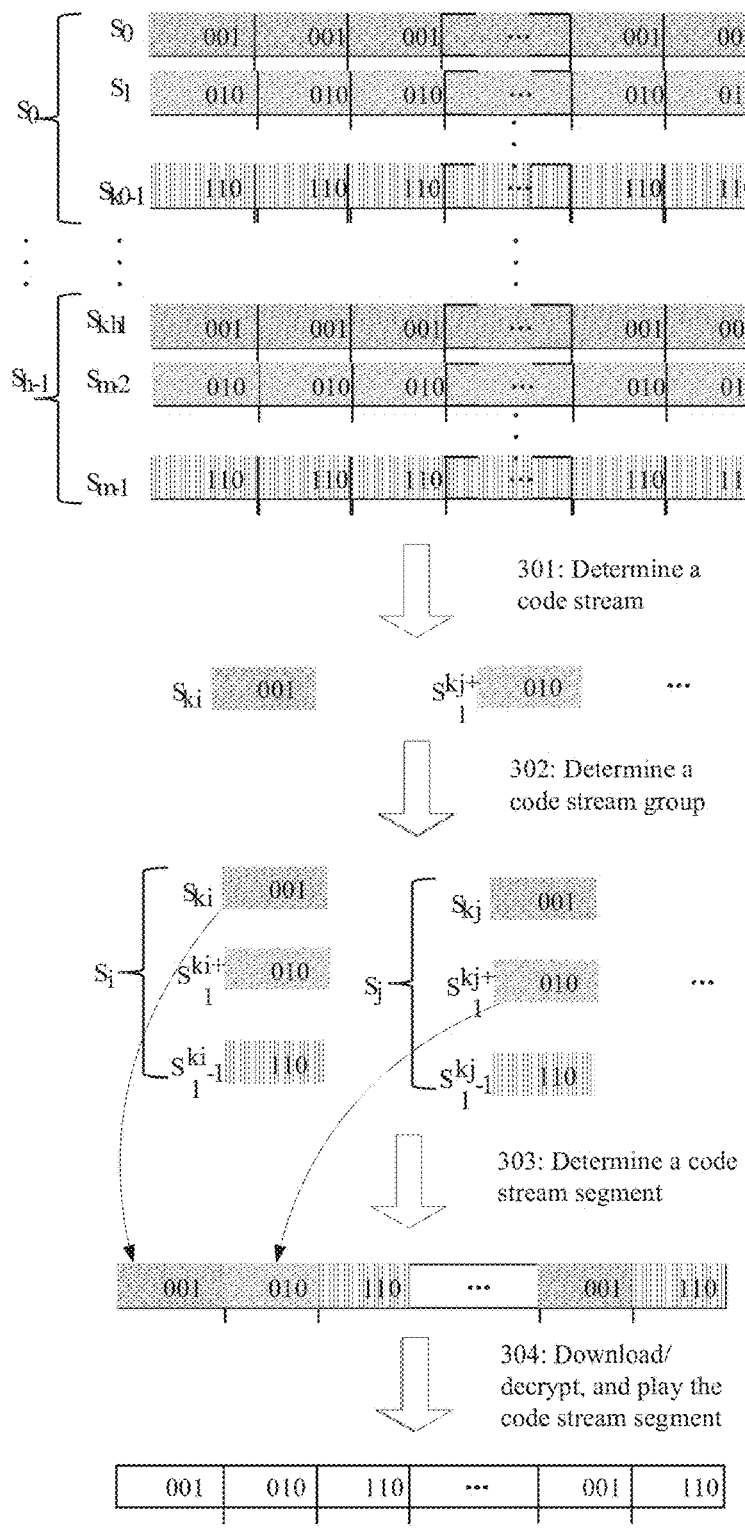
FIG. 9 is a flowchart of processing, of a selected code stream segment by a terminal, disclosed in Embodiment 5 of the present invention.

A download address of a code stream segment that should be selected is obtained by using the foregoing process, and a corresponding code stream segment is downloaded from the server end for playback. A process shown in FIG. 9 can be briefly summarized as follows: 301. Determine a code stream—302. Determine a code stream group—303. Determine a code stream segment13 304. Download or decrypt, and play the code stream segment.

Figure 10:
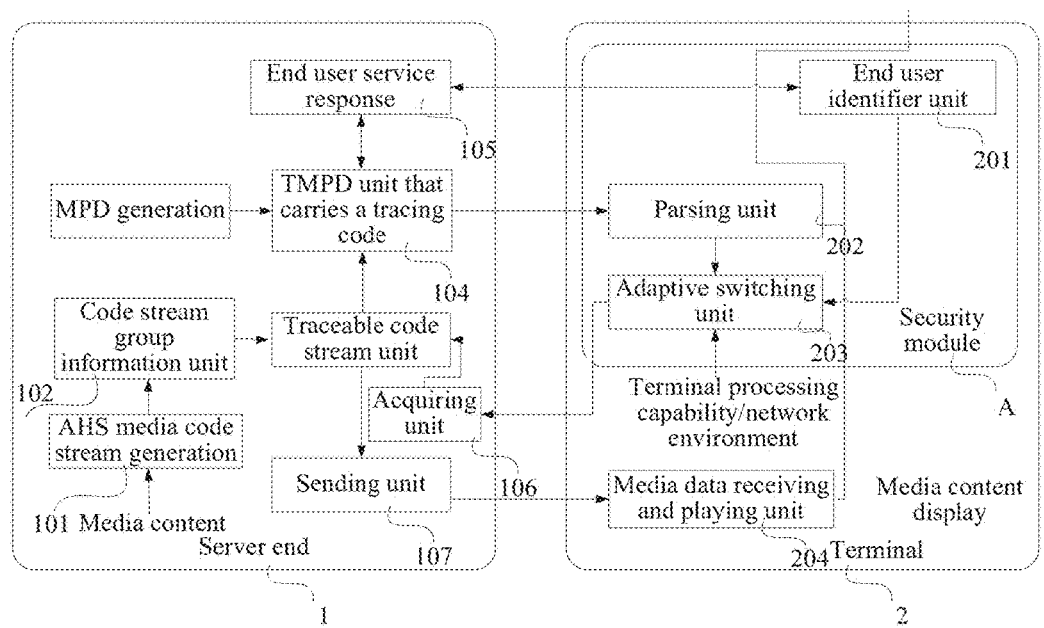
FIG. 10 is a schematic structural diagram of an AHS system disclosed in an embodiment of the present invention.

Based on the server end and the terminal that are disclosed in the foregoing Embodiment 4 and Embodiment 5 of the present invention, as shown in FIG. 10, this embodiment of the present invention further discloses an AHS system, where the AHS system mainly includes a server 1 and a terminal 2 that are disclosed in the foregoing Embodiment 4 and Embodiment 5.

In addition, the method, the server, and the terminal that are disclosed in the present invention are not limited to the AHS system, are also applicable to distribution of media content based on network bandwidth and a terminal processing capability, including video (such as Internet video) and audio (such as VoIP and mp3 digital music), and support traceability of a terminal that distributes the foregoing content.

As disclosed in the present invention, media code streams of m types of code rate are divided into h groups, and different tracing codes are separately embedded into code stream segments of each group of code streams; the tracing codes and media code stream group information are stored in an MPD; and in a downloading process of a terminal, tracing of an end user that downloads media data is implemented by using a tracing code. That is, the tracing code is consistent with a terminal identifier of a receiving terminal; therefore, based on the foregoing process, media information that supports pirate tracing can be generated, and a problem of pirate tracing in an AHS service can be implemented.

In addition, a transmitted TMPD may be encrypted to further improve security performance in a transmission process.

The embodiments in this specification are all described in a progressive manner, for same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method.

In combination with the embodiments disclosed in this specification, method or algorithm steps may be implemented directly by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

The embodiments disclosed above are described to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but extends to the widest scope that complies with the principles and novelty disclosed in this specification.

What is claimed is:

1. A method for generating media information, the method comprising:
    generating m media code streams of media content that correspond to m types of code rates for adaptive HTTP streaming (AHS) delivery of media content, wherein each of the m media code streams respectively comprises a plurality of segments, and wherein m is an integer greater than 1;
    dividing the m media code streams into h code stream groups, wherein each code stream group of the h code stream groups comprises a plurality of media code streams of the m media code streams, wherein the each code steam group of the h code stream groups comprises media code streams of different qualities, and wherein h is an integer greater than 1;
    embedding a respective tracing code of a plurality of tracing codes in each of the plurality of segments of each media code stream in each code stream group of the h code stream groups, wherein the respective tracing code embedded in each of the plurality of segments is unique in the respective code stream group for the media code stream of the segment in which the respective tracing code is embedded;
    generating code stream group information, the code stream group information comprising an identification of the each code stream group of the h code stream groups, and, for the each code stream group of the h code stream groups, an identification of each of the plurality of media code streams included in the respective code stream group, information about a quality of the each of the plurality of media code streams included in the respective code stream group, an identification of each segment of the plurality of segments of the each of the plurality of media code streams included in the respective code stream group, and the tracing code of the each segment of the plurality of segments of the each of the plurality of media code streams included in the respective code stream group;
    storing the code stream group information in a media presentation description (MPD) file, and generating a traceable media presentation description (TMPD) file using the MPD file, wherein, in the code stream group information in the TMPD file, the identification of the each of the plurality of media code streams included in the respective code stream group, the information about the quality of the each of the plurality of media code streams included in the respective code stream group, the identification of the each segment of the plurality of segments of the each of the plurality of media code streams included in the respective code stream group, and the tracing code of the each segment of the plurality of segments of the each of the plurality of media code streams included in the respective code stream group, are each associated with the identification of the respective code stream group;
    receiving a request of a first terminal for the media content; and
    sending the TMPD file to the first terminal;
    wherein, when a first media code stream of the m media code streams is selected for AHS delivery of the media content to the first terminal, the TMPD file provides a corresponding tracing code that is associated with a plurality of segments of the first media code stream to generate a first corresponding traceable code stream for the first terminal from the plurality of segments embedded with the corresponding tracing code.

2. The method according to claim 1, wherein, after the sending the TMPD file to the first terminal, the method further comprises:
    acquiring code stream request information sent by the first terminal, wherein the code stream request information is obtained by the first terminal according to an identifier of the first terminal and a parsing result of the TMPD, and wherein the identifier of the first terminal or a part of the identifier of the first terminal is consistent with the corresponding tracing code associated in the TMPD file with the first media code stream selection;

selecting the plurality of segments that form the first media code stream selection and that are embedded with the corresponding tracing code, to generate the first corresponding traceable code stream according to the code stream request information; and sending the plurality of segments that are selected to the first terminal.

3. The method according to claim 2, wherein, before sending the plurality of segments to the first terminal, the method further comprises encrypting each of the plurality of segments that are selected to generate the first corresponding traceable code stream.

4. The method according to claim 1, wherein dividing the m media code streams comprises dividing the m media code streams according to a code stream quality/code stream similarity principle, wherein each code stream group comprises m/h media code streams out of the m media code streams, h indicating h different types of quality, a value of the m/h being $2^x$, and x being greater than or equal to 1.

5. The method according to claim 1, wherein embedding the tracing code of the plurality of tracing codes in the each of the plurality of segments of each media code stream in each code stream group comprises: embedding the tracing code of the plurality of tracing codes in the each of the plurality of segments of the each media code stream in the each code stream group, wherein each tracing code has a length K, wherein the K is a number determined by the code stream group information;

wherein different tracing codes are embedded into the plurality of segments of media code streams of different code rates that are in a same code stream group.

6. The method according to claim 1, further comprising:
identifying that the first terminal is illegally distributing the media content by:
capturing a plurality of segments in a second traceable code stream;
obtaining a terminal identifier according to a tracing code embedded into the plurality of segments that are captured; and
performing tracing according to the terminal identifier identified with the tracing code associated with the second traceable code stream that matches the first corresponding traceable code stream, according to the TMPD file.

7. The method according to claim 6, wherein capturing the plurality of segments in the second traceable code stream comprises capturing the plurality of segments in the second traceable code stream from a second terminal; and wherein obtaining the terminal identifier according to the tracing code comprises obtaining an identifier of the first terminal according to the tracing code embedded in the plurality of segments that are captured from the second terminal.

8. The method according to claim 1, wherein the MPD file further includes attribute information for each the media code stream, including a code rate, quality, an address, and authorization information of the respective media code stream; and wherein generating the TMPD file further comprises storing the attribute information in the MPD file, and generating a traceable version of the attribute information in the TMPD file.

9. The method according to claim 1, wherein, when generated, the TMPD file is unrelated to the first terminal or any other terminal requesting the media content, and the TMPD file is unique to the media content.

10. The method according to claim 9, further comprising:
receiving a request of a second terminal; and
sending the TMPD file to the second terminal;
wherein, when a second media code stream of the m media code streams is selected for AHS delivery to the second terminal, the TMPD file provides a corresponding tracing code that is associated with the selected second media code stream to generate a second corresponding traceable code stream for the second terminal; and wherein the second corresponding traceable code stream generated for the second terminal is different from the first corresponding traceable code stream generated for the first terminal when the second media code stream selection is different from the first media code stream selection.

11. A server, comprising:
a processor; and
a non-transitory computer-readable storage medium storing a program to be executed by the processor, the program including instructions to:
generate m media code streams of media content that correspond to m types of code rates for adaptive HTTP streaming (AHS) delivery of the media content, wherein each of the m media code streams respectively comprises a plurality of segments, and wherein m is an integer greater than 1;
divide the m media code streams into h code stream groups, wherein each code stream group of the h code stream groups comprises a plurality of media code streams of the m media code streams, and wherein h is an integer greater than 1;
embed a respective tracing code of a plurality of tracing codes in each of the plurality of segments of each media code stream in each code stream group, wherein the respective tracing code embedded in each of the plurality of segments is unique in the respective code stream group for the media code stream of the segment in which the respective tracing code is embedded;
generate code stream group information, the code stream group information comprising an identification of the each code stream group of the h code stream groups, and, for the each code stream group of the h code stream groups, an identification of each of the plurality of media code streams included in the respective code stream group, information about a quality of the each of the plurality of media code streams included in the respective code stream group, an identification of each segment of the plurality of segments of the each of the plurality of media code streams included in the respective code stream group, and the tracing code of the each segment of the plurality of segments of the each of the plurality of media code streams included in the respective code stream group;
store the code stream group information in a media presentation description (MPD) file, and generate a traceable media presentation description (TMPD)

file using the MPD file, wherein, in the code stream group information in the TMPD file, the identification of the each of the plurality of media code streams included in the respective code stream group, the information about the quality of the each of the plurality of media code streams included in the respective code stream group, the identification of the each segment of the plurality of segments of each of the plurality of media code streams included in the respective code stream group, and the tracing code of the each segment of the plurality of segments of the each of the plurality of media code streams included in the respective code stream group, are each associated with the identification of the respective code stream group; and generate and store a terminal identifier, to receive a request of a terminal for the media content, and to send the TMPD file to the terminal;

wherein, when a media code stream of the m media code streams is selected for AHS delivery of the media content to the terminal, the TMPD file provides a corresponding tracing code that is associated with the selected media code stream to generate a corresponding traceaeble code stream for the terminal from the plurality of segments embedded with the corresponding tracing code.

12. The server according to claim 11, wherein the instructions further comprise instructions to:

acquire code stream request information sent by the terminal, wherein the code stream request information is obtained by the terminal according to the terminal identifier and a parsing result of the TMPD, and the terminal identifier or a part of the terminal identifier is consistent with the tracing code associated in the TMPD file with the selected media code stream; and select the plurality of segments that are embedded with the tracing code and that are identified as forming the selected media code stream, to generate a corresponding traceable code stream according to the code stream request information; and send the selected plurality of segments to the terminal.

13. The server according to claim 11, wherein the instructions to divide comprise instructions to divide the m media code streams according to a code stream quality/a code stream similarity principle, each code stream group in the h code stream groups comprising m/h types of code stream, wherein the h indicates h different types of quality, a value of the m/h is $2^x$, and x is greater than or equal to 1.

14. The server according to claim 11, wherein the instructions to embed the tracing code comprise instructions to embed the tracing code whose length is K into each of the plurality of segments of the each media code stream in the each code stream group of the h code stream groups, wherein K is a number determined according to the code stream group information.

15. The server according to claim 11, wherein the instructions to embed, for the each media code stream in the each code stream group, the tracing code comprise instructions to embed different tracing codes into the plurality of segments of media code streams of different code rates that are in a same code stream group.

16. The server according to claim 11, wherein the instructions further comprise instructions to encrypt each of the plurality of segments in the corresponding traceable code stream.

17. A terminal, comprising:

a non-transitory memory, configured to save a terminal identifier of an end user;

a receiver, configured to receive from a server and to parse a media presentation description (TMPD) file, wherein the TMPD file comprises code stream group information, the code stream group information comprises an identification of each code stream group of h code stream groups, and, for the each code stream group of the h code stream groups, an identification of each of a plurality of media code streams included in the respective code stream group, information about a quality of the each of the plurality of media code streams included in the respective code stream group, an identification of each segment of a plurality of segments of the each of the plurality of media code streams included in the respective code stream group, and a tracing code of the each segment of the plurality of segments of the each of the plurality of media code streams included in the respective code stream group, wherein, in the code stream group information in the TMPD file, the identification of the each of the plurality of media code streams included in the respective code stream group, the information about the quality of the each of the plurality of media code streams included in the respective code stream group, the identification of the each segment of the plurality of segments of each of the plurality of media code streams included in the respective code stream group, and the tracing code of the each segment of the plurality of segments of each of the plurality of media code streams included in the respective code stream group, are each associated with the identification of the respective code stream group, and wherein h is an integer greater than 1; and a processor, configured to parse the TMPD file and to generate, according to the terminal identifier, a parsing result of the TMPD file, and a terminal processing capability and/or a network environment as code stream request information to be fed back to a server;

wherein the code stream request information is used to select a media code stream for the terminal from m media code streams generated by the server corresponding to m types of code rate for adaptive HTTP streaming (AHS) delivery of media content, wherein m is an integer greater than 1; and wherein an association between the selected media code stream with a corresponding tracing code in the TMPD file is used by the server to generate a corresponding traceable code stream for the terminal from the plurality of segments embedded with the corresponding tracing code.

18. The terminal according to claim 17, wherein the processor is further configured to:

determine, according to the terminal processing capability and/or the network environment, a code rate of a media code stream that can be normally received by the terminal;

select a media code stream from the m media code streams of which the code rate is not greater than and close to a normal code rate according to code rate information parsed from the TMPD, and to acquire a code stream group to which the selected media code stream belongs; and select a code stream segment from the m media code streams of the acquired code stream group, wherein the code stream segment includes the terminal identifier or tracing code information that is consistent with a part of information about the terminal identifier; and wherein the terminal further comprises a transmitter, configured to send information about the selected code stream segment to the server as code stream request information; and wherein the code stream group is one of the h code stream groups formed by the server dividing the m media code streams into the h code stream groups, wherein each code stream group indicates media code streams of a quality different from a quality of media code streams in other code stream groups, and the code stream group information is generated by the server about a plurality of code stream segments forming the each media code stream in the each code stream group.

19. The terminal according to claim 17, wherein the processor is further configured to decrypt the TMPD file, when the received TMPD file is encrypted, before parsing the TMPD file.

* * * * *